United States Patent
Sun et al.

(10) Patent No.: US 7,184,847 B2
(45) Date of Patent: Feb. 27, 2007

(54) METHOD AND SYSTEM FOR CONTROLLING A PROCESS IN A PLANT

(75) Inventors: Hongqiao Sun, Sugar Land, TX (US); W. Spencer Wheat, Missouri City, TX (US); Vesna R. Mirkovic, Pearland, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 11/015,376

(22) Filed: Dec. 17, 2004

(65) Prior Publication Data

US 2006/0136075 A1  Jun. 22, 2006

(51) Int. Cl.
*G05B 13/02* (2006.01)

(52) U.S. Cl. .......................... 700/42; 700/28; 700/37; 700/43; 700/45; 318/609; 318/610; 318/621

(58) Field of Classification Search ............... 700/28, 700/41, 42, 43, 44, 45, 46, 37; 318/610, 318/609, 621
See application file for complete search history.

(56) References Cited

U.S. PATENT DOCUMENTS

| 4,602,326 | A | | 7/1986 | Kraus |
| 5,153,807 | A | | 10/1992 | Saito et al. |
| 5,570,743 | A | * | 11/1996 | Padgett et al. ............... 166/285 |
| 5,812,394 | A | * | 9/1998 | Lewis et al. .................. 700/17 |
| 6,081,751 | A | | 6/2000 | Luo et al. |
| 6,162,488 | A | * | 12/2000 | Gevelber et al. .............. 427/8 |
| 2004/0074311 | A1 | * | 4/2004 | Lull et al. ..................... 73/861 |

* cited by examiner

*Primary Examiner*—Ramesh Patel
(74) *Attorney, Agent, or Firm*—Frank C. Turner; Melissa Patangia

(57) ABSTRACT

A method and system are disclosed for controlling a process by establishing a control factor for a proportional-integral-derivative (PID) controller used to control a parameter of a process relative to a setpoint. A feedback signal regarding the parameter of the process is received via a sensor of the process and a first feedback loop. Automatic adjusting of the control factor of the PID controller is based on the feedback signal.

41 Claims, 7 Drawing Sheets

METHOD AND SYSTEM FOR CONTROLLING A PROCESS IN A PLANT

BACKGROUND

A method and system for controlling a plant process are disclosed. In process control systems, proportional-integral-derivative (PID) control has been used for process feedback control. A process response is fed back to a PID controller used to adjust a variable, such as a temperature, pressure or flow rate of the process. The PID controller uses the feedback to, for example, adjust an output command to the process for purposes of keeping the process stable.

The PID controller is configured using settings relating to the process. For example, a gain is established in each path of the PID controller (that is, the proportional (P) path, the integral (I) path and/or the derivative (D) path). The settings are manually selected by running tests on the actual process. The manual selection involves having detailed knowledge of the process. The settings can be manually updated from time-to-time by re-running the tests.

Automatic updating of PID controller settings has been performed off-line and/or using a model of the process being controlled. To accurately model the plant, PID hardware controllers are provided which are limited to individual loops, and which are dedicated to a particular process variable of the plant. Dedicated, individual loop controllers are used, at least in part, because they simplify the modeling of the process.

SUMMARY

A method is disclosed for controlling a process, comprising establishing a control factor for a proportional-integral-derivative (PID) controller used to control a parameter of a process relative to a setpoint; receiving a feedback signal regarding the parameter of the process via a process and a first feedback loop; and automatically adjusting the control factor of the PiD controller based on the feedback signal.

An apparatus is disclosed for controlling a process, comprising means for receiving a setpoint for a parameter of the process; means for receiving a feedback signal regarding the parameter of the process via a sensor of the process and a first feedback loop; means for comparing the setpoint with the feedback signal to produce an error signal; means for processing the error signal in parallel PID paths; and means for automatically adjusting a control factor of at least one of the PID paths based on the feedback signal.

A system is disclosed for controlling a process comprising a user interface for establishing a setpoint for a proportional-integral-derivative (PID) controller used to control a parameter of a process; a feedback loop for receiving a feedback signal regarding the parameter of the process via a sensor of the process; and a processor for automatically adjusting the control factor of the PID controller based on the feedback signal.

BRIEF DESCRIPTION OF THE DRAWINGS

Features and advantages described herein will be more readily apparent from a detailed description of exemplary embodiments as illustrated in the drawings, wherein.

DETAILED DESCRIPTION

Figure 1:
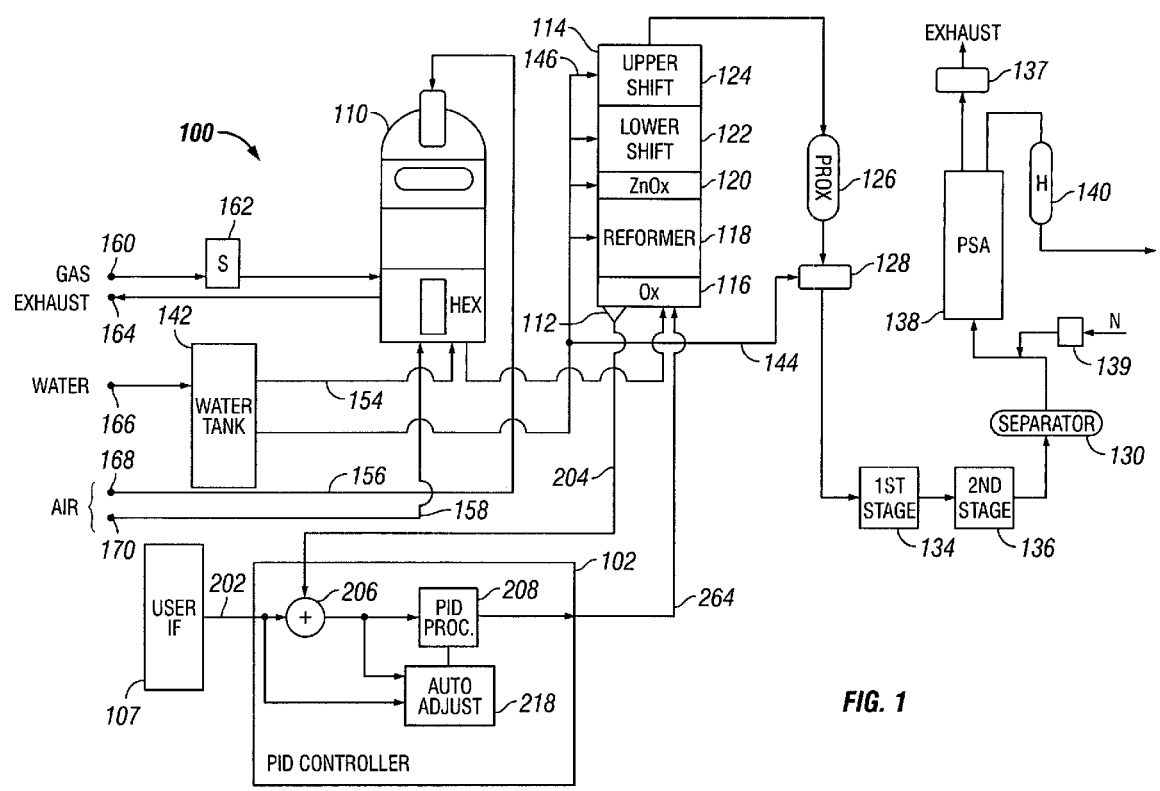
FIG. 1 shows a method and system for controlling one or more process parameters in a plant according to an exemplary embodiment.

FIG. 1 shows an exemplary control system for controlling one or more process parameters in a process of a plant 100 using an automatic adjusting, or auto-tuning, of control factors use to modify the gain in each path of the PID controller. As referenced herein, a "plant" is any system of any size used for processing, wherein variables for process control can be monitored and regulated. An exemplary apparatus for controlling a process in the plant is represented as a PID controller 102 having proportional (P), integral (I) and derivative (D) paths. As will be discussed in greater detail with respect to FIG. 2, the PID controller 102 includes a PID processor 208. Each path of the PID processor can have a control factor for modifying the path gain. The control factors are automatically adjusted, or tuned, by a control factor processor 218. Those skilled in the art will appreciate that any number of PID controllers can be included.

Each PID controller 102 can regulate one or more parameters of the process carried out by the plant 100. The controller 102 receives a setpoint signal via setpoint input 202 and receives a feedback signal via a feedback input 204 from the process. The setpoint can be established and received via a user interface 107. An error signal is generated by an adder 206 (e.g., providing any suitable combination of the input signals) of the PID controller. An output of the adder is supplied to the PID processor 208 and to the control factor processor 218 to produce a process parameter control output signal 264.

The setpoint can be a variable parameter used in the process control, such as a physical characteristic including, but not limited to, a temperature setpoint, a pressure setpoint, a flow rate setpoint, or any other desired setpoint of any desired process. The feedback signal can be an actual feedback signal received from a sensor, such as an inline sensor of the plant. Those skilled in the art will appreciate that the feedback signal need not be received directly from a sensor and that the sensor need not be in-line, but rather, can be any process sensor suitable for a target portion of the process and the operational conditions, such as the temperature at a specific location in the plant which is being controlled by the output signal 264.

For example, in the process shown, the PID controller 102 can be used to regulate the temperature of a heating element or elements in a bottom portion of a reformer (e.g., in a partial oxidation bed), or any other desired process parameter of any desired process. The reformer which is included in the plant has a heater which responds to the output signal 264. The setpoint is a desired operation point for the reformer's temperature. The feedback signal can be a signal from an actual in-line temperature sensor included in or near the reformer, and a feedback loop. The feedback provides an accurate temperature measure to the PID controller 102, for comparison with the temperature setpoint. In an exemplary embodiment, the sensor is illustrated as an external sensor 112, although any suitable sensor, can be used.

The PID controller of the exemplary FIG. 1 embodiment, generates an error signal between the setpoint and the feedback, which is then processed using PID paths to produce the output signal 264 for process control. A steady state error limit (e.g., ±2% or any other desired limit) can be set as well. The heater can be turned on or off at a certain percentage of its capacity to maintain the temperature as close to its setpoint as possible.

A control factor is established for the PID controller in controlling the parameter of the process relative to the setpoint. Initially, the PID control factors can be set at default values (e.g., established via the user interface, or in any desired manner). When the process starts responding to the heater output, the PID control factors can begin self-adjusting (i.e., auto-tuning) based upon analysis of process characteristics under current settings. The PID control factors can be locked when the process response achieves the predetermined setpoint and the steady state error limit.

In accordance with exemplary embodiments, the control factors of the PID controller can thus be automatically adjusted based on the feedback signal. The automatic adjusting can, in accordance with exemplary embodiments, be performed in real time, using actual feedback signals from the plant process. A separate control factor provided for each path of the PID controller can be individually adjusted.

A process error can be periodic for a dynamic process in a feedback control system. In accordance with exemplary embodiments, the PID controller dynamically analyzes a process response to extract process characteristics such as overshooting, undershooting, rising time, falling time, and steady state error. However, any other desired process characteristics can be taken into account. Using these process characteristics, the PID controller automatically adjusts control factors of the PID paths to improve process response. For example, overshoot and undershoot can be used to adjust the PID control factors. The rising time and falling time can be used to calculate a period of process oscillation, and to determine the rate at which incremental changes, or adjustments, are applied to previous values of each control factor. Steady state error can be determined from undershoot, overshoot, rising time and falling time, and can be used to determine when to stop the automatic adjustment of PID control factors.

In exemplary embodiments, setpoint changes can be used to initiate an auto-tuning process, beginning from current PID control factor values. The automatic adjustment can be performed in accordance with specified requirements, such as established limits on overshooting, undershooting, steady state error, rising time, falling time, and/or any other desired physical characteristics. Alternately, or in addition, generic auto-tuning using a default setting can be performed without specific limits.

In accordance with exemplary embodiments, any number of process parameters can be controlled by a given PID controller, and/or any number of PID controllers can be provided. For each additional PID controller, an additional control factor can be established. A feedback signal regarding each additional parameter of the plant process can be received via an additional sensor and an additional feedback loop. The additional control factor, like the control factor already discussed, can be automatically adjusted based on the feedback signal. Where an additional PID controller is used, the parameter of the PID controller and the additional PID controller can be interdependent.

In operation, automatic adjustment of the control factors for each path of the PID controller can, for example, be triggered by a change in the setpoint. In accordance with exemplary embodiments, an output signal of the PID controller is sent to an actuator of the plant process as a function of the setpoint (e.g., only when the process setpoint is nonzero). Adjustments can be permitted when the error signal and the setpoint satisfy predetermined criteria. For example, in processing the setpoint and the error signal to automatically adjust the control factors for each of the paths in the PID controller, the feedback signal received via the in-line sensor can be used to determine at least one of falling time, rise time, overshoot, undershoot and steady state error of the parameter being controlled by the PID controller 102. The predetermined criteria can include determining that a peak magnitude of error signal overshoot beyond the setpoint is at a new maximum. The predetermined criteria can be evaluated over a time period of oscillation of the error signal. The automatic adjustment can then be concluded when the steady state error is within a specific range.

The error signal can be conditioned in the PID controller for input to the actuator of the plant process. The conditioning can include dynamically mapping values of the error signal to the actuator. This conditioning can include, for example, capturing an upper limit and a lower limit of the output signal, and merging the upper limit and the lower limit for use in the dynamic mapping.

When adjustment of the control factors is desired, an amount of the adjusting can be weighted using weighting factors determined empirically. The weighting factors can, for example, be stored in a look-up table which is accessed when the predetermined criteria is satisfied.

In accordance with exemplary embodiments, operation of the PID controller can be initiated using default values. These default values can be selected for each control factor to be automatically adjusted, and can, for example, be selected for each of the proportional, integral and derivative paths of the PID controller.

Before discussing details by which the feedback and setpoint are used to produce an error signal that is processed in the PID controller 102, an exemplary process implemented by the plant 100 of FIG. 1 will be described.

The exemplary controller 102 of FIG. 1 is shown as being associated with a hydrogen generation process plant 100. In the FIG. 1 plant, a tail gas combustor 110 is used to preheat reactants, such as natural gas, water, and air, and to combust certain exhaust gases. A reformer 114 is an autothermal reformer which, in ascending order as depicted, includes a partial oxidation bed 116, a steam reforming bed 118, a zinc oxide bed 120 for removing sulfur-containing compounds, and lower and upper water gas shift beds 122, 124 for removing carbon monoxide. An optional preferential oxidation (PrOx) reactor 126 can be provided for removing carbon monoxide from the reformate. A heat exchanger 128 is provided for cooling the reformate coming out of the reformer.

The FIG. 1 process plant 100 also includes compressors 134, 136 for compressing reformate prior to introduction into a pressure swing absorption unit 138 having various associated pressure release valves 137 and flow control valves 139. Water separation devices 130 can be provided for removing water. A tank 140 is provided for holding hydrogen which exits the pressure swing adsorption unit 138 prior to dispensing or storage of the hydrogen.

A water supply and return tank 142, which includes a radiator system for cooling return water is included in the FIG. 1 plant. The water supply system includes cooling lines 144 and 146. Line 154 is a water supply line for the tail gas combustor 110. Separate air supply lines are provided for combustion, represented as a secondary air supply 156, and for use as a reactant, represented as a primary air supply 158 to the tail gas combustor 110. A natural gas supply 160 supplies gas via a sulfur removal device 162 to the tail gas combustor 110. An exhaust outlet 164 is also provided, along with the water inlet 166, and air intakes 168, 170.

Figure 2:
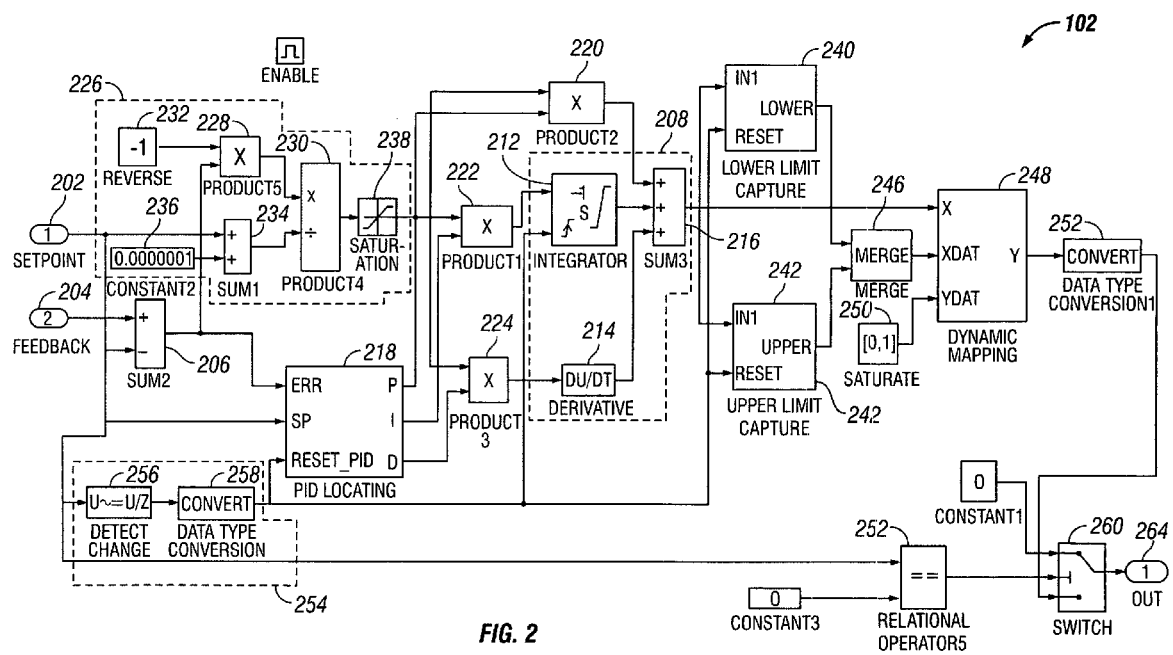
FIG. 2 shows a functional block diagram of an exemplary PID controller which can be used in the control of the FIG. 1 process.

Details of the exemplary controller 102 in the FIG. 1 plant will be described with respect to FIGS. 2–7. FIG. 2 shows a functional block diagram of an exemplary PID controller 102.

Referring to FIG. 2, the PID controller 102 constitutes an apparatus for controlling the process, and includes a means, such as the setpoint input 202, for receiving a setpoint for a parameter, such as a temperature of the plant process. The PID controller also includes a means, such as the input 204, for receiving a feedback signal regarding the parameter of the plant process via a sensor of the process and a first feedback loop. A means, such as a differential adder 206, is provided for comparing the setpoint with the feedback signal to produce an error signal. A means, such as a PID processor 208, is provided for processing the error signal in parallel PID paths; namely, a proportional path 210, an integral path 212 having an integrator included therein, and a derivative path 214 having a differentiator included therein. The three PID paths connect with an adder 216 for producing an output of the PID processor 208.

A means, such as a control factor processor 218, is provided for automatically adjusting a control factor of at least one of the PID paths based on the feedback signal. In the exemplary FIG. 2 embodiment, the control factor processor 218 supplies outputs to one or more of the gain adjusting multipliers 220, 222 and 224.

The FIG. 2 PID controller can include a means such as a normalizer 226, for normalizing the error signal. In the example shown, the normalizer 226 can include mathematical function blocks 228 and 230. The multiplier block 228 multiplies the error signal by a reversing constant 232, to invert the error signal for signal formatting. The inverted error signal is divided by the setpoint in the mathematical function block 230. Due to the adder 234 and a constant set forth in a constant block 236, division by zero is avoided when normalizing the error signal. The output of the mathematical function block 230 represents the error signal normalized with respect to the setpoint signal, and is supplied to an amplitude limiter 238 to limit the normalized value and avoid saturation. The output of the amplitude limiter is supplied to the PID processor 208 via the multipliers 220, 222 and 224 associated with the control factor processor 218.

The PID controller 102 includes a means for conditioning an output "X" of the PID processor, represented as a lower limit capture block 240 and an upper limit capture block 242. The outputs of the two blocks capture upper and lower limits of the PiD controller output, and are merged via a merge function 246. The lower limit capture block and the upper limit capture block can store upper and lower output signals from the PID processor 208 so that the magnitude of the range of error signals produced by the PID processor can be adapted to the range of the actual actuator used in the processing plant.

The merging function merges the amplitude limited outputs of the lower limit and upper limit capture blocks into an X-data value that can be used by a means for formatting, represented as a dynamic mapping block 248. The dynamic mapping block 248 maps an output of the PID processor to a set range of actuator voltages. For example, where the outputs supplied by the lower and upper limit capture blocks range from zero to ten volts, these outputs can be dynamically mapped to a range from zero to one, when this latter range is required for input to an actuator of the plant process.

As shown in FIG. 2, the "X" output of the PID processor is supplied to the dynamic mapping block 248. The merged outputs from the lower and upper limit capture blocks are supplied to an "xdat" input of the dynamic mapping block. Saturation limits for a Y value in the dynamic mapping are supplied via a saturate block 250 to a "ydat" input of the dynamic mapping block. An output of the dynamic mapping block is supplied to converter block 252 for providing a value suitable for input to an actuator of the plant.

The PID controller 102 includes a means, such as a detector 254, for initiating the automatic adjusting of the controller factors in the PID processor based on a change in the setpoint. The initiating means can include a detector 256 for detecting when the setpoint has changed a predetermined amount. This amount can be converted via a converter 258 to a level suitable for input to the control factor processor 218 and to the lower and upper limit capture blocks 240, 242, so that a reset operation occurs when the setpoint has changed by the predetermined amount. This predetermined amount can, for example, be configured by the user (e.g., via the user interface).

The PID controller 102 also includes means, such as a switch 260, for controlling an output of the apparatus. The switch 260 is used to select between an output of the PID processor, and a constant, such as zero. A relational operator 262 is configured to monitor the setpoint, and ensure that the switch only allows an output of the PID processor to be routed to the output 264 after the setpoint has changed from zero.

Figure 3:
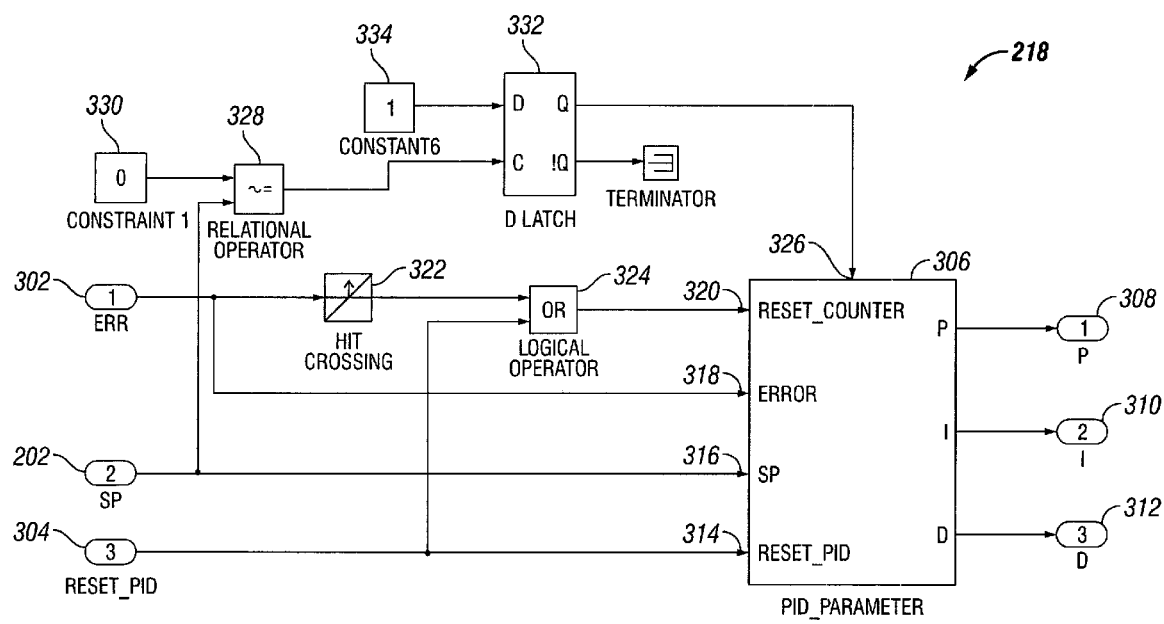
FIG. 3 shows a functional block diagram of an exemplary processor for automatically determining adjustments to the control factors of the FIG. 2 PID controller.

FIG. 3 shows an exemplary implementation of the control factor processor 218 in greater detail. As shown, the control factor processor receives the error signal from the differential adder 206 as error signal 302. The control factor processor also receives the setpoint 202, and the reset PID input 304 produced via the detector 254. The control factor processor 218 includes a means, represented as a PID parameter processor 306, for producing control factors for any or all of the PID paths. The control factors are labeled 308 for the proportional path, 310 for the integral path and 312 for the derivative path.

The reset PID input 304 is supplied to an input 314 of the PID parameter processor 306 to reset the control factor adjustment processor when the setpoint has changed. The setpoint 202 is supplied to a setpoint input 316 of the processor 306. The error signal 302 is supplied to an input 318 of the processor 306. The error signal is also supplied through a hit crossing block 322 and a logical operator, such as an "OR" operator 324, to produce a reset counter input 320 of the processor 306. A counter of the processor 306 determines one-half of an oscillation period of the error signal for monitoring steady state error. The logical OR operator 324 receives an input from the reset PID input 304 as well.

When the error signal has exceeded the setpoint value in a positive direction, peaked, and then decreased in value to the point where it crosses over the setpoint value, as detected by the hit crossing block 322, a logical "1" is supplied to the OR operator 324. This resets the counter via reset counter input 320 of processor 306. Similarly, when the reset PID input 304 transitions to a logical 1, the reset counter input 320 is used to reset the counter of the processor 306 via the OR operator 324. Thus, OR operator 324 defines a time period that begins when the setpoint has changed, and is reset when the error signal crosses the setpoint to begin a new oscillation period about the setpoint.

The processor 306 includes an enable input 326 to enable operation of the processor so that one or more control factors can be produced at the outputs 308, 310 and/or 312. A means for enabling the PID parameter processor 306 includes a relational operator 328 which ensures that the processor 306 is not enabled unless the setpoint has changed from zero. Prior to the setpoint having been changed, a constant 330, such as zero, is supplied to the clock input of a latch 332 to prevent the processor 306 from being enabled. The latch, such as a D flip-flop 332, clocks a logical "1" from an input 334 when the setpoint has changed from zero as detected by the relational operator 328. The latched Q output of the flip-flop 332 triggers the enable input 326 of the PID parameter processor 306.

Figure 4A:
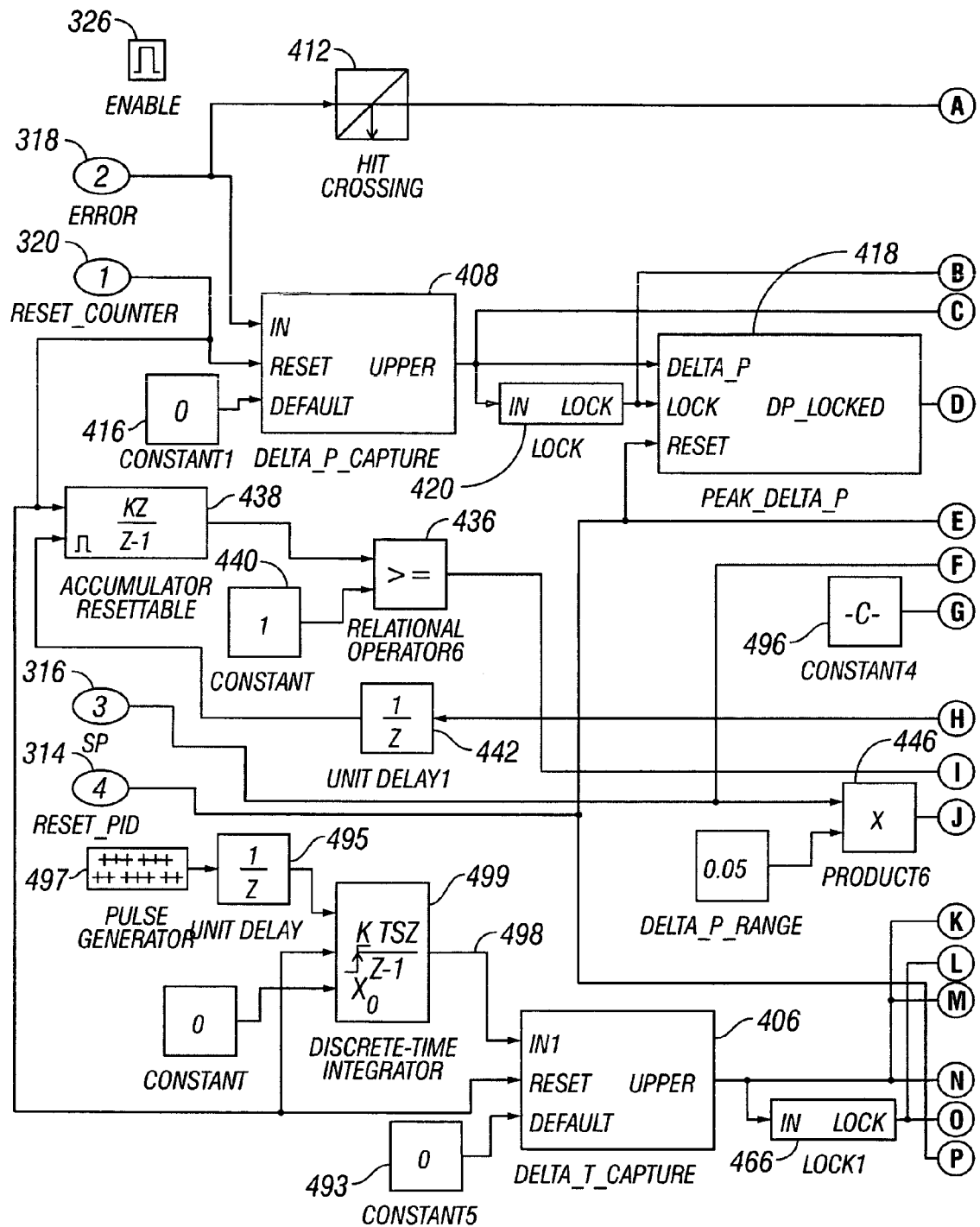
FIGS. 4A and 4B show a functional block diagram of a processor for adjusting the PID control factors in the FIG. 3 processor.
Figure 4B:
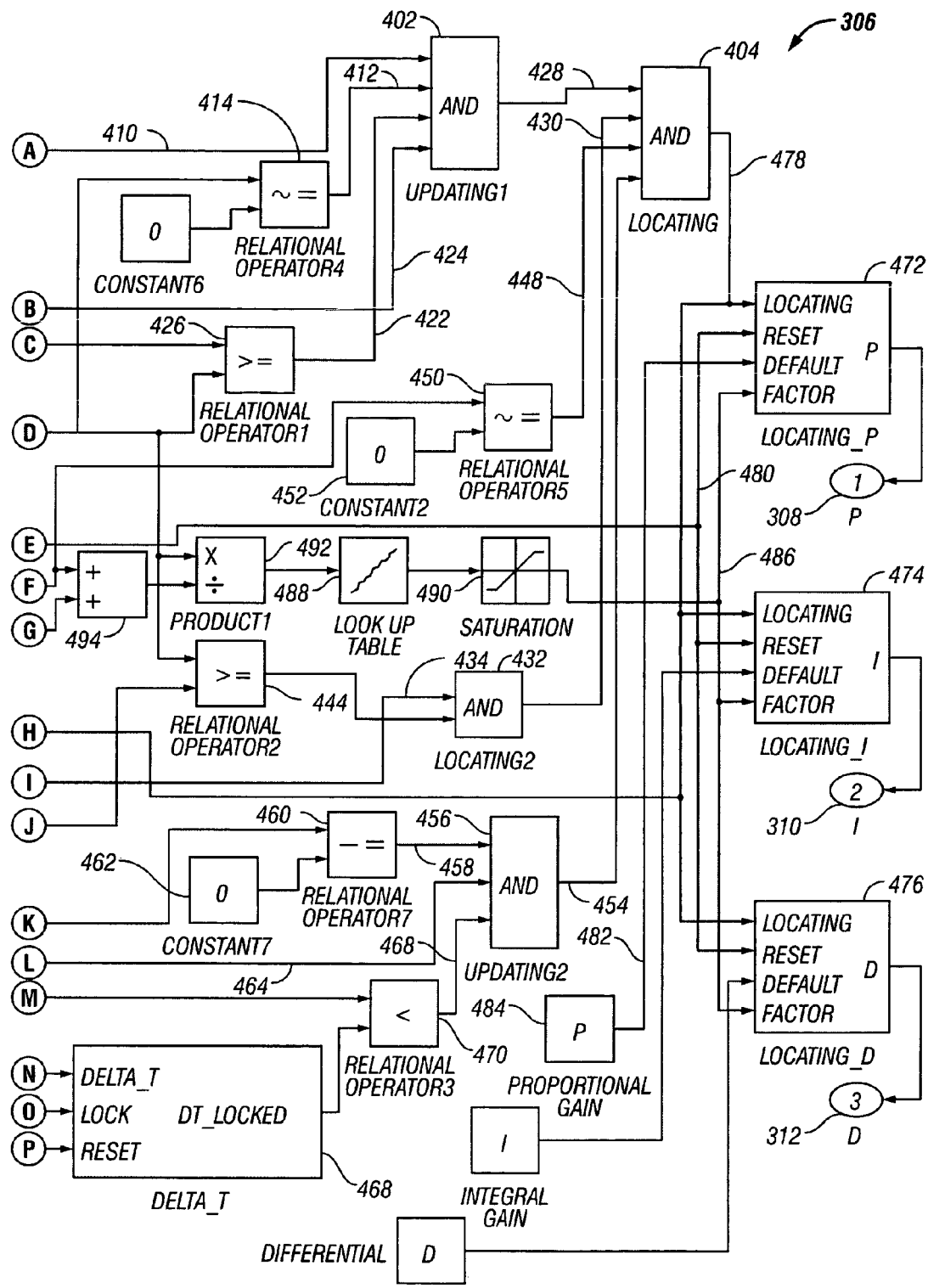

Details regarding the PID parameter processor 306 are illustrated in FIG. 4A, and identify the conditions upon which the control factors for the PID paths 308, 310 and 312, respectively, are automatically adjusted based on the inputs 314, 316, 318, 320 and 326. The enable input 326 is illustrated as indicating that, in an exemplary embodiment, the processor 306 is enabled on the occurrence of a pulse.

The processor 306 includes a delta parameter (P) processor 408 for capturing changes in the error signal for the parameter being monitored, so that overshoot and undershoot can be detected. A delta time period (T) processor 406 is provided for capturing a period of process oscillation as a function of the rising and falling time of the error signal. A steady state error can be calculated using the overshoot, undershoot, rising time and falling time, so that the automatic adjusting of the PID control factors can be discontinued when steady state error is reduced to a desired (e.g., an acceptable) level.

The delta P processor 408 begins with a default value 416, such as 0, and captures a magnitude of an error signal overshoot beyond the setpoint within an interval corresponding to one half of an oscillation of the error signal about the setpoint. The delta P processor 406 is reset when the reset counter signal goes high, indicating that the error signal has returned to the setpoint value to begin a new oscillation period upon completion of a full period of oscillation about the setpoint. As the period of oscillation about the setpoint increases, an indication is provided that an unstable condition is occurring and modifications to the control factors can be automatically adjusted so that the period of oscillation of the error signal will be reduced.

The PID parameter processor 306 is configured to automatically adjust the control factors 308, 310 and 312 in response to a change in the setpoint, and upon the occurrence of predetermined criteria. Logical operators can be used to require multiple criteria to exist at a point in time designated by the user. These logical operations are performed by a means for logically combining, represented as AND gates 402 and 404, although any desired logic (software or hardware implemented) can be used.

Generally speaking, the means for capturing a delta time interval, represented as the delta T processor 406, is used to produce information regarding the error signal oscillation. The separate means for capturing a change in the parameter being controlled, represented as the delta P processor 408, plays a role in determining when the control factors on outputs 308, 310 and 312 will be updated. The conditions on which the control factors are updated will now be described in greater detail with respect to the AND gates 402 and 404 of FIG. 4B.

A first input 410 of AND gate 402 is a logical "1" when the error signal crosses below the setpoint after having overshot the setpoint, as detected by detector 412. A second input 412 of the AND gate 402 corresponds to the output of a relational operator 414. The relational operator 414 compares a detected peak change in the error signal (i.e., representing the peak difference between the set point and the feedback signal) with a constant, such as "zero". If the peak error is greater than zero, the second input 412 to the AND gate is a logical 1. The peak error signal, as already mentioned is detected via the delta P processor 408.

In operation, a detected peak in the error signal is output from the delta P processor 408, to the input of a peak delta P latch 418 via a delta P lock 420 which stores a prior peak value for delta P. The output of the delta P processor 408 is supplied to the input of the lock 420 so that it can be held for input to the latch 418, wherein a current delta P peak can be compared with a prior delta P peak.

Whenever the current delta P peak exceeds the previous maximum delta P peak, the new peak is stored in lock 420 for comparison with subsequent delta peak values accumulated during the current period of interest. The current period of interest is reset via a reset input of the delta P latch 418 in response to the reset PID signal 314. As already mentioned, whenever the delta peak exceeds a constant such as zero, the relational operator 414 supplies a logical "1" to the AND gate 402 to indicate an overshoot condition.

A third input 422 of the AND gate 402 corresponds to an output of a relational operator 426. The relational operator 426 supplies a logical "1" to the third input of an AND gate 402 when the current delta P peak, received at a first input of the relational operator 426 exceeds a prior peak, indicating overshoot instability.

Finally, a fourth input 424 of the AND gate 402 corresponds to an output of the delta P peak lock 420. Thus, when a current lock delta P peak is greater than zero, a logical "1" will be supplied to the fourth input of the AND gate 402.

When all four inputs of the AND gate 402 are logical "1", an output is supplied from AND gate 402 to a second AND gate 404. The output from AND gate 402 is supplied at a first input 428 of the AND gate 404.

A second input 430 of the AND gate 404 corresponds to the output of an AND gate 432. The AND gate 422 receives two inputs. A first input 434 corresponds to the output of a relational operator 436, which compares resettable accumulator value in block 438 with a constant 440, such as 1. The accumulator counts a number of pulses which occur from the time a setpoint change has occurred (i.e., reset PID goes high) and a crossing of the error signal from an undershoot condition past the setpoint (see output of the OR operator 324 in FIG. 3). When the count output of the resettable accumulator exceeds the predetermined constant 440, a "1" value is supplied to the AND gate 432. The resettable accumulator block 438 receives the reset counter signal 320 and receives an output of the AND gate 404 delayed via a unit delay 442 as an enable signal. Thus, assuming the enable signal is active at the resettable accumulator block 438, a value of the reset counter signal 320 which exceeds the constant will enable the relational operator to produce a logical "1" and thereby enable AND gate 432.

Returning to the AND gate 432, a second input is received via a relational operator 444, which compares the locked peak delta P value from the delta P latch 418 with an output of a multiplier block 446. The multiplier block 446 multiplies the setpoint 316 by a delta P range value, such as 0.05 or any other desired value, to ensure that only when the setpoint has changed by at least 5% will a logical 1 be supplied to enable AND gate 432 and thereby enable AND gate 404. In other words, when the setpoint, for a given cycle, has not changed by at least a minimum predetermined amount (e.g., 0.05), the AND gate 404 will not be enabled, and the control factors for the PID outputs 308, 310 and 312 will not be automatically adjusted.

A third input 448 of the AND gate 404 is received via a relational operator 450, which compares a constant 452, such as zero, with the setpoint 316. Thus, when the setpoint exceeds zero, logical 1 be supplied to the input 448 of AND gate 404, to enable automatic adjustment of the PID control A fourth exemplary input 454 of the AND gate 404 corresponds to an enable signal associated with the delta T processor 406 which is used to determine an oscillation period of the error signal based on its rising and falling times. The fourth input 454 corresponds to the output of an AND gate 456.

The AND gate 456 receives three inputs. A first input 458 of the AND gate 456 corresponds to the output of a relational operator 460, which compares the output of the delta T processor 406 with a constant 462, such as zero. When the delta T output exceeds zero, a logical "1" is supplied on the first input 458 to enable AND gate 456.

A second input 464 of the AND gate 456 corresponds to a locked value for the delta T processor as stored in a lock 466. When a value exists for the delta T to indicate that an error oscillation is occurring, the AND gate 456 is enabled via this input.

A third input 468 of the AND gate 456 corresponds to the output of a relational operator 470. The relational operator compares the current output of the delta T processor 406 with a previous output stored and captured in delta T latch 468. When the current value of the delta T capture exceeds the previously stored value latched in delta T latch 468, indicating that the oscillation period is increasing, a logical 1 is supplied via relational operator 470 to the third input of the AND gate 456. When the three conditions of the AND gate 456 exist, the AND gate 404 is enabled via the fourth input 454.

When all four conditions for AND gate 404 exist, update processors 472, 474 and 476 are used to automatically adjust the control factors for one or more of the PID outputs 308, 310 and 312. The output of AND gate 404 serves as an enable signal for each of these update processors.

Referring to the first update processor for the proportional path (i.e., processor 472), the output of AND gate 404 can be seen as a first input 478 to initiate locating an adjusted value for the control parameter of the proportional path output 308. A second input to the processor 472 corresponds to a reset signal 480. The reset signal 480 corresponds to the reset PID signal 314. A third default input 482 of the update processor 472 corresponds to an initial proportional gain which can, for example, be established by the user and stored in a memory. The value for this proportional gain is represented as block 484. A fourth input 486 of the update processor 472 corresponds to the control factor used to automatically adjust the gain in the proportional path by modifying the output for the proportional path 308. In an exemplary embodiment, the control factor 486 can be produced using a look-up table 488. An output of the look-up table is conditioned for an input to the update processors via a saturation block 490 which limits the value of the output from the look-up table.

To address the look-up table 488, an input is supplied from a mathematical operator 492 which receives an output of the delta P peak from latch 418 and which receives an input from an adder 494. The adder 494 combines the setpoint 316 with a constant "C" in block 496. The constant ensures that division by zero will not occur in the mathematical operator 492, which divides the peak in the delta P output by the setpoint.

The value stored in the look-up table which is accessed by a ratio of the delta P peak to the setpoint can be empirically determined. These values can be determined for a given process so that appropriate modifications of the PID control factors 308, 310, 312 will occur for a given setpoint, and error signal. Similar control factors are generated for the integral and derivative paths 310, 312 using inputs for update processors 474 and 476 that correspond to the inputs described already with respect to the update processor 472 of the proportional path.

For purposes of determining a time interval which is captured in the delta T processor 406, reference is made to the three inputs of this processor 406. A first input 498 corresponds to the output of a discrete time integrator 499. The discrete time integrator 499 is reset via the reset counter signal 320, and when once enabled, accumulates pulses from a pulse generator 497 received via a unit delay 495. The delta T processor 406, like the discrete time integrator 499, is reset via the reset counter signal 320. A default value such as a constant zero in block 494 ensures that the output of the delta T processor 406 will not drop below zero.

The output of the delta T processor 406 is supplied to the latch 468 wherein it can be stored for comparison with later delta T values in relational operator 470. The purpose of the delta T capture path is to ensure that oscillations of the error signal about the setpoint reduce over time. However, if the oscillations increase in period, it can be determined that the error signal is not settling around the setpoint so that appropriate modifications can be made to the control factors on outputs 308, 310 and 312.

Figure 5:
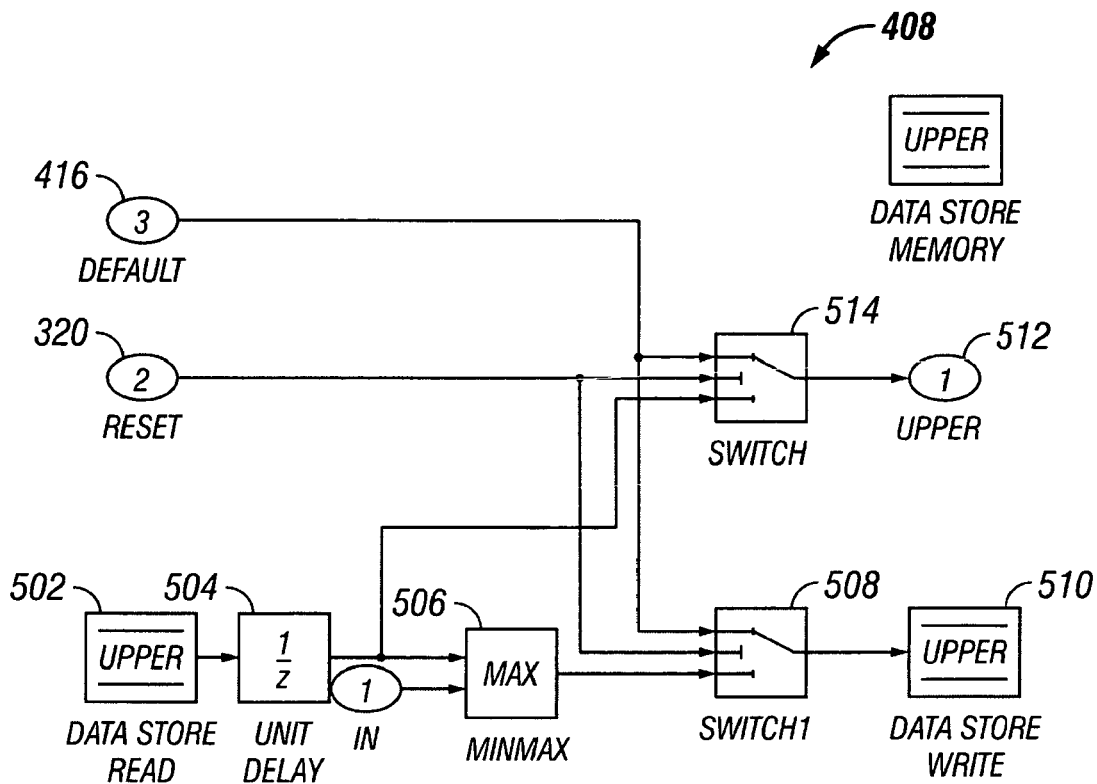
FIG. 5 shows a functional block diagram of a portion of the FIG. 4 processor for capturing a magnitude of change in the process parameter being controlled by the setpoint.

FIG. 5 illustrates details regarding the delta P processor 408. As shown therein, inputs correspond to the default signal 416, the reset counter signal 320 and the error signal 318, which has been read and stored as an upper error signal via a data store read block 502. The output of the data store read block 502 is supplied to a unit delay 504. A MinMax block 506 compares the output of the delayed data store read with a logical 1.

The output of the MinMax block 506 is supplied as the input to a switch 508 which is controlled by the reset signal 320. At reset, the output from the MinMax block is supplied to a data store write block 510 to ensure that the new MinMax value is stored. Otherwise, a default value is supplied to the data store write block 510.

The signal output from the delta P processor 408, represented as an output 512, is received via a switch 514 which is also controlled by the reset signal 320. When the reset signal is received, the data store read value in the data store read block 502, as unit delayed, is supplied to the output 512. Otherwise, a default value 416 is supplied to the output 512.

Figure 6:
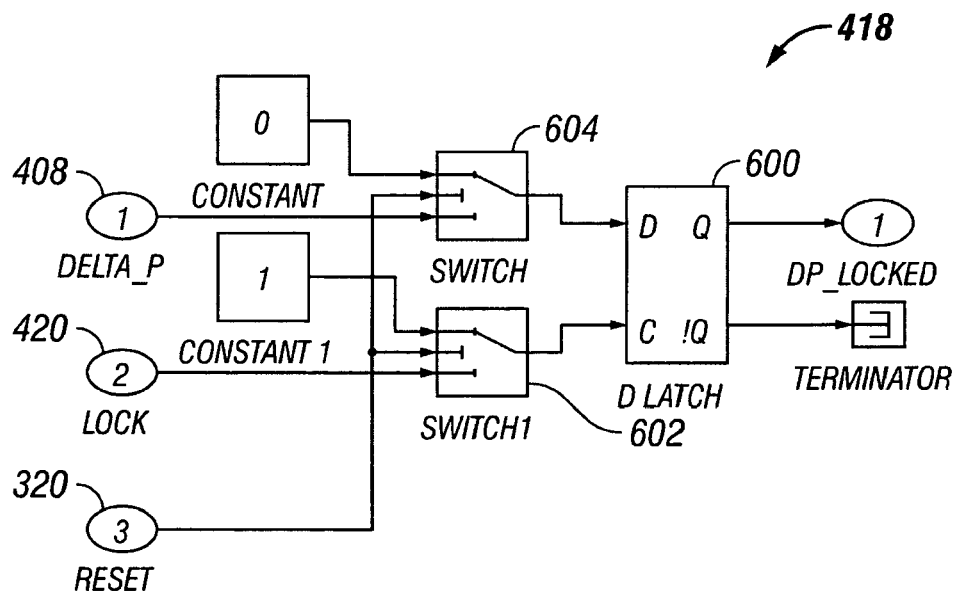
FIG. 6 shows a functional bock diagram of a portion of the FIG. 4 processor for determining a peak magnitude of the change detected by the FIG. 5 processor.

FIG. 6 shows an exemplary functional implementation of the peak delta P latch 418. A latch 600 is provided, such as a D flip-flop, for producing the clocked output representing the peak delta P value. The latch 600 is clocked via a switch 602 which is normally at a logical "1", but upon occurrence of the reset signal 320, supplies the lock peak value in block 420 to the clock input. A switch 604 is normally logical "zero", but upon occurrence of the reset signal, supplies the delta peak value output from the delta P processor 408 to the D input. If this value is greater than zero, a logical 1 is clocked to the output of the D latch 600.

Figure 7:
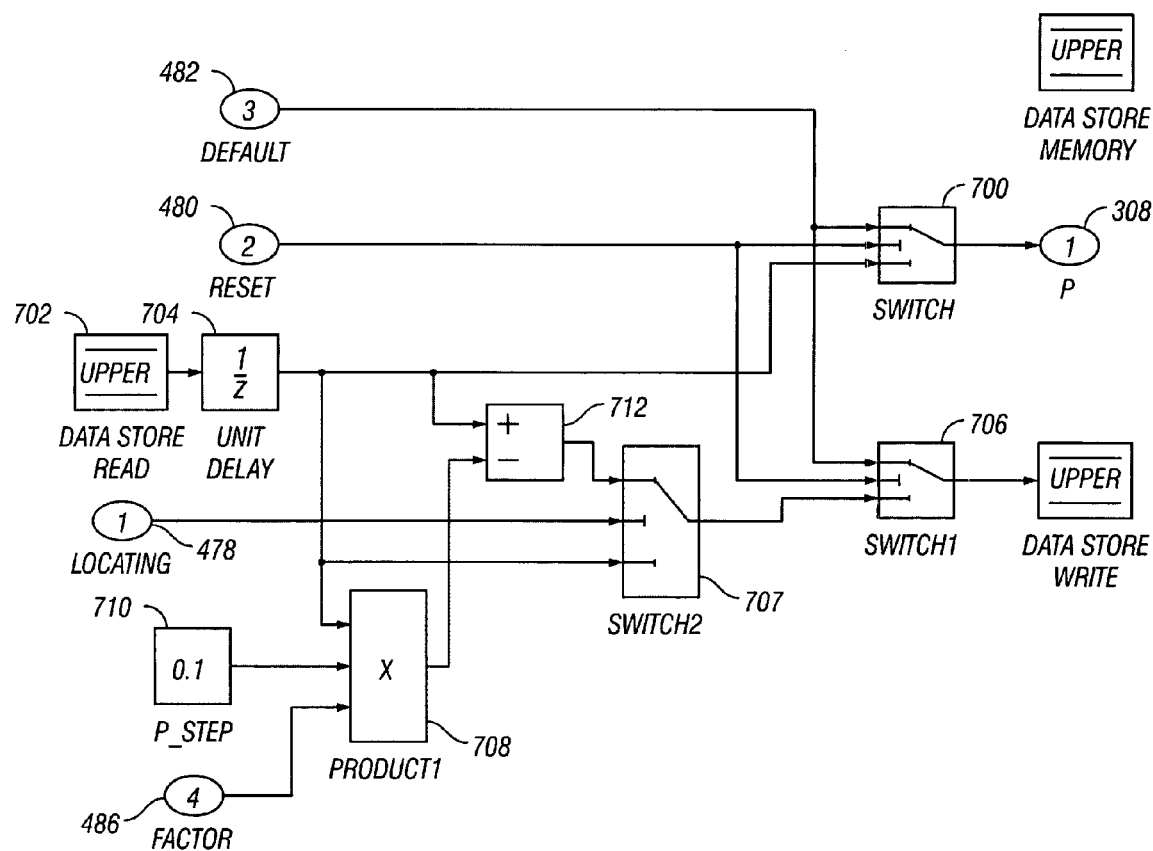
FIG. 7 shows a functional block diagram of a portion of the FIG. 4 processor for determining an adjustment to a PID control factor.

FIG. 7 shows an exemplary implementation of an exemplary update processor such as the update processor 472 which produces the control factor 308. Similar processors can be configured for the integral and derivative control factors 310 and 312.

Referring to FIG. 7, the locating input 478, the reset input 480, the default reset 482 and the factor input 486 are illustrated. The control factor 308 for the proportional path 408 is shown as an output which can be supplied to a data store memory. The control factor 308 is output via a switch 700 which normally receives the default value 402. Upon occurrence of the reset value 380, the switch transitions to provide an output from a data store 702 via a unit delay 704.

During the adjustment period, prior to updating the value 308, a new value is determined during the delta T capture period. The captured value is written to memory via the switch 706, which normally supplies the default 482 to the memory. Upon occurrence of the reset, a new value is supplied to the data store. The output of the data store read 702 is supplied via a unit delay 704 to one input of the multiplier 708 wherein it is multiplied by the control factor supplied via the look-up table 488 of FIG. 4B. Thus, the current value for the proportional path stored in memory, is multiplied by the factor from the look-up table and weighted via an input 710 (e.g., 10% weighting). The weight can be based on the process. When the process error is significant, it can be adjusted to, for example, 100% or any desired amount.

The output of the mathematical operator 708 is also supplied to another mathematical operator 712 (e.g., an adder) for combination with the output from the data store 702. This output is supplied via switch 706 to memory as an automatically adjusted control factor for the proportional output 308 in the absence of a PID locating signal 478. As already mentioned, similar configurations as illustrated in FIG. 7 can be provided for each of the integral and derivative paths as well.

Those skilled in the art will appreciate that the foregoing description of the embodiments illustrated in FIGS. 1–7 is by way of example, and that numerous variations will be readily apparent to those skilled in the art. For example, those skilled in the art will appreciate that the functional block diagrams described can be implemented in software and/or hardware, the hardware being analog, digital or any combination thereof. In addition, those skilled in the art will appreciate that the separate functions attributed to various processors can, of course, be combined in a single processor, or any or all of the functions described herein can be segregated into an increased number of dedicated processors for performing specified functions. Each processor described herein can, for example, be implemented as a microprocessor or other computer, and/or can be configured as a combination of hardware, software and firmware components. Those skilled in the art will appreciate that any of the logical functions described herein can be implemented in a variety of ways. In addition, all of the values described herein are by way of example only, and those skilled in the art will appreciate that any of these values can be adapted to a specific process and/or desired operation of the controller.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. Method for controlling a process comprising:
   establishing a control factor for a proportional-integral-derivative (PID) controller used to control a parameter of a plant process relative to a setpoint;
   receiving a feedback signal regarding the parameter of the process via a sensor of the process and a first feedback loop; and
   automatically adjusting the control factor of the PID controller based on the feedback signal.

2. Method according to claim 1, wherein the parameter is a physical characteristic of the process.

3. Method according to claim 1, wherein the automatic adjusting is performed in real time.

4. Method according to claim 1, comprising:
   establishing an additional control factor for an additional PID controller used to control the process;
   receiving a feedback signal regarding an additional parameter of the process via an additional sensor and an additional feedback loop; and
   automatically adjusting the additional control factor based on the feedback signal.

5. Method according to claim 4, wherein the parameter and the additional parameter are interdependent.

6. Method according to claim 1, comprising: using the feedback signal received via the sensor to detect at least one of falling time, rising time, overshoot, undershoot, and steady state error of the parameter.

7. Method according to claim 1, comprising:
   establishing a setpoint for the parameter; and
   comparing the feedback signal received via the sensor with the setpoint to produce an error signal.

8. Method according to claim 7, comprising:
   conditioning the error signal within the PID controller for input to an actuator of the plant process, wherein the conditioning includes dynamically mapping the error signal to the actuator.

9. Method according to claim 8, wherein the conditioning includes:
   capturing an upper limit and a lower limit of the error signal; and
   merging the upper limit and the lower limit for use in the dynamic mapping.

10. Method according to claim 1, comprising:
    sending an output signal of the PID controller to an actuator of the process as a function of a setpoint for the parameter.

11. Method according to claim 10, wherein the output signal of the PID controller is only sent to the actuator when the setpoint is nonzero.

12. Method according to claim 7, wherein the automatic adjusting of the control factor of the PID controller is performed when a change in the setpoint is detected.

13. Method according to claim 12, wherein the automatic adjusting of the control factor is performed when predetermined criteria have been satisfied, wherein the predetermined criteria include determining that a peak magnitude of error signal overshoot beyond the setpoint is at a new maximum.

14. Method according to claim 12, wherein the predetermined criteria are determined over a period of oscillation of the error signal relative to the setpoint.

15. Method according to claim 12, wherein the automatic adjusting is discontinued when a steady state error of the parameter relative to the setpoint falls to a desired level.

16. Method according to claim 12, wherein an amount of the adjusting is weighted using weighting factors determined empirically.

17. Method according to claim 16, wherein the weighting factors are stored in a look-up table.

18. Method according to claim 17, wherein separate control factors are individually adjusted for each of the proportional, integral, and derivative paths of the PID controller.

19. Method according to claim 12, wherein an initial default value is selected for each of the proportional, integral and derivative paths.

20. Apparatus for controlling a process comprising:
means for receiving a setpoint for a parameter of the process;
means for receiving a feedback signal regarding the parameter of the process via a sensor of the process and a first feedback loop;
means for comparing the setpoint with the feedback signal to produce an error signal;
means for processing the error signal in parallel PID paths; and
means for automatically adjusting a control factor of at least one of the PID paths based on the feedback signal.

21. Apparatus according to claim 20, comprising:
means for normalizing the error signal.

22. Apparatus according to claim 20, comprising:
means for conditioning an output of the error signal processing means to produce a conditioned output signal.

23. Apparatus according to claim 22, comprising:
means for formatting the conditioned output signal by dynamically mapping the conditioned output signal to a process actuator.

24. Apparatus according to claim 20, comprising:
means for initiating the automatic adjusting when a change in the setpoint is detected.

25. Apparatus according to claim 24, comprising:
means for controlling an output of the apparatus based on a change in the setpoint.

26. Apparatus according to claim 20, wherein the means for automatically adjusting includes:
means for producing a control factor for at least one PID path.

27. Apparatus according to claim 26, wherein the means for producing a control factor includes:
means for capturing a peak change in the error signal over a given time period.

28. Apparatus according to claim 24, wherein the means for automatically adjusting performs an adjustment of a control factor when predetermined criteria has been satisfied, and wherein the predetermined criteria include determining that a peak magnitude of error signal overshoot beyond the setpoint is at a new maximum.

29. Apparatus according to claim 28, wherein automatic adjusting of the control factor by the adjusting means occurs when:
a predetermined oscillation period of an error signal has been exceeded.

30. Apparatus according to claim 28, wherein automatic adjusting by the adjusting means occurs when:
the setpoint exceeds zero;
an oscillation period of the error signal is increasing.

31. Apparatus according to claim 27, wherein a control factor is adjusted using empirical data stored in a look-up table which is accessed as a function of the setpoint and a peak error of the feedback signal relative to the setpoint.

32. System for controlling a process comprising:
a user interface for establishing a setpoint for a proportional-integral-derivative (PID) controller used to control a parameter of a process;
a feedback loop for receiving a feedback signal regarding the parameter of the process via a sensor of the process; and
a processor for automatically adjusting the control factor of the PID controller based on the feedback signal.

33. System according to claim 32, comprising:
a detector for detecting a change in the setpoint.

34. System according to claim 32, wherein the processor comprises:
a first processor for determining a peak error signal of the feedback signal relative to the setpoint; and
a time processor for determining a period of oscillation of the error signal relative to the setpoint.

35. System according to claim 32, comprising:
logic for determining when predetermined criteria have been satisfied, and enabling automatic adjustment of the control factor when the predetermined criteria have been satisfied.

36. System according to claim 35, wherein the logic includes at least one AND gate.

37. System according to claim 32, comprising:
a look-up table for storing control factors determined empirically for the plant process.

38. System according to claim 37, wherein the look-up table is accessed using the setpoint and a detected peak error of the feedback signal relative to the setpoint.

39. System according to claim 32, comprising:
a circuit for conditioning an output of the processor for input to an actuator of the process.

40. System according to claim 39, wherein the circuit dynamically maps the processor output to the actuator input by detecting lower and upper limits of an output from a PID processor included in the PID controller.

41. System according to claim 32, comprising:
a switch for gating an output of the PID controller to an actuator of a plant only when the setpoint is greater than zero.

* * * * *